US011906337B2

(12) United States Patent
Griffin et al.

(10) Patent No.: US 11,906,337 B2
(45) Date of Patent: Feb. 20, 2024

(54) INLINE TRANSDUCER HOUSING ASSEMBLY

(71) Applicant: Honeywell International Inc., Morris Plains, NJ (US)

(72) Inventors: Michael Griffin, Newport Pagnell (GB); Hailab Kubrom, Harrow (GB); Rodmer Paderes, Luton (GB); Conor Hogan, Luton (GB); Martin May, Houghton Regis (GB)

(73) Assignee: Honeywell International Inc., Charlotte, NC (US)

( * ) Notice: Subject to any disclaimer, the term of this patent is extended or adjusted under 35 U.S.C. 154(b) by 214 days.

(21) Appl. No.: 17/176,168

(22) Filed: Feb. 15, 2021

(65) Prior Publication Data

US 2022/0260401 A1 Aug. 18, 2022

(51) Int. Cl.
*G01F 1/66* (2022.01)
(52) U.S. Cl.
CPC .................... *G01F 1/662* (2013.01)
(58) Field of Classification Search
None
See application file for complete search history.

(56) References Cited

U.S. PATENT DOCUMENTS

| 6,237,425 B1* | 5/2001 | Watanobe | G01F 1/3266 |
| | | | 73/861.22 |
| 2018/0043395 A1* | 2/2018 | Zeidan | G10K 11/002 |
| 2019/0033106 A1* | 1/2019 | Ramond | G01F 1/662 |
| 2019/0186968 A1* | 6/2019 | Bar-on | G01F 1/667 |

* cited by examiner

*Primary Examiner* — Harshad R Patel
(74) *Attorney, Agent, or Firm* — Ortiz & Lopez, PLLC; Kermit D. Lopez; Luis M. Ortiz (57) ABSTRACT

An inline transducer meter body can include a channel that can accept a separate core to enable formation of a port to accept a sensor assembly and a notch to help stabilize the sensor assembly in alignment with fluid flow. The inline transducer meter body can include a circular shelf adapted to receive a transducer assembly that interfaces in a complimentary manner with a circular ledge of a circular head section of the transducer assembly, a portal formed between the circular shelf and an inner surface of the housing adapted to interface in a complimentary manner with an alignment section of the transducer, and a notch formed in the inner surface of the flow tube opposite the portal to interface with a positioner formed on and extending from a transducer holder.

16 Claims, 5 Drawing Sheets

INLINE TRANSDUCER HOUSING ASSEMBLY

TECHNICAL FIELD

Embodiments are related to fluid flow meters. More particularly, embodiments are related to a flow meter adapted to securely place and hold an inline transducer housing assembly within fluid flowing through a conduit. Embodiments are also related to use of an injection mould tool utilizing 3D printed inserts to render an inline transducer housing assembly body.

BACKGROUND

Flow meters are sophisticated measuring devices that employ a range of technologies designed to quantify the rate or volume of a moving fluid, either liquid or gas, in an open or closed conduit. The type of flow meter used will vary by application, but coriolis, differential pressure, magmeter, electromagnetic, oval gear, thermal, paddlewheel, positive displacement and ultrasonic are the most commonly used technologies.

Ultrasonic flow meters use sound waves as a reliable, accurate and maintenance free method to measure the velocity of a fluid from which the volumetric flow rate can be calculated. They feature no moving parts making them more reliable and accurate while providing maintenance-free operation. Since ultrasonic signals can also penetrate solid materials, the transducers can be mounted onto the outside of the pipe offering completely non-invasive measurement eliminating chemical compatibility issues, pressure restrictions, and pressure loss. Inline mounting of transducers, however, can provide the most accurate measurement of fluid flow.

Despite improvements in technology, it can still be a challenge to achieve accurate fluid flow measurement over a long period of time without degradation of quality or sensor integrity given challenges that can be experienced when transducers are placed within (i.e., in-line with) the flow of fluid to be measured. What is needed are improvements in the placement of transducers within a conduit wherein fluid is flowing through the conduit.

SUMMARY

Embodiments are presented to achieve accurate inline fluid flow measurement over a long period while minimizing degradation of measurement data quality.

The following summary is provided to facilitate an understanding of some of the features of the disclosed embodiments and is not intended to be a full description. A full appreciation of the various aspects of the embodiments disclosed herein can be gained by taking the specification, claims, drawings, and abstract as a whole.

Embodiments presented are also to achieve accurate inline fluid flow measurement over a long period while minimizing degradation of quality by using ultrasonic flowrate sensing technology.

In accordance with the embodiments, a flow tube to support an inline transducer housing assembly can be fabricated by using a liquid cooled tool that can include a channel that can accept a core that can enable formation of a port to then accept a sensor assembly, and can also enable formation of a notch to help stabilize the sensor assembly in alignment with fluid flow.

In accordance with another feature of the embodiment, a resulting assembly from fabrication can include a circular shelf formed on the housing assembly adapted to receive a transducer assembly that interfaces in a complimentary manner with a circular ledge of a circular head section of the transducer assembly, a portal formed between the circular shelf and an inner surface of the housing adapted to interface in a complimentary manner with an alignment section of the transducer, and a notch formed in the inner surface of the flow tube opposite the portal to interface with a positioner formed on and extending from a transducer holder operating to secure the transducer holder flow alignment.

In accordance with yet another embodiment, an inline transducer meter assembly having an inlet and an outlet for fluid flowing through the inline transducer meter assembly from the inlet to the outlet is presented that includes a circular shelf integrated in an inline transducer meter body adapted to receive a transducer assembly that interfaces in a complimentary manner with a circular ledge of a circular head section of the transducer assembly, a square or rectangular portal formed between the circular shelf and an inner surface of the inline transducer meter body adapted to interface in a complimentary manner with an alignment section of the transducer assembly having a reduced surface area to reduce upshot force on the alignment section by fluid flowing through the inline transducer housing assembly body and past the square or rectangular portal, and a notch formed in the inner surface of the flow tube opposite the square or rectangular portal and adapted to interface with a positioner formed on and extending from a transducer holder as part of the transducer assembly, the transducer holder positioned near a center of the inline transducer meter body between the square or rectangular portal and the notch, the positioner further configured to operate with the square or rectangular portal to secure the transducer holder in alignment with the fluid as it flows through the inline transducer meter body.

In accordance with another embodiment, a method for fabricating an inline transducer meter body with 3D moulding is described that includes steps of providing a fabrication tool that can be mounted to a 3D moulding machine, the fabrication tool having a moving section formed by a 3D printer and including at least one cooling channel therein for accepting fluid coolant to keep the surface cool during fabrication of the inline transducer meter body, wherein the fabrication tool has at least one channel formed through the surface that is configured to receive a square or rectangular core therein to prevent material from being placed in the channel during fabrication, adding material onto the surface using moulding while cooling the surface via coolant circulating through the at least one tool channel, removing the core from the fabrication tool, and removing the fabrication tool from the material added onto the surface of the fabrication tool. Removal of the core from the fabrication tool and then removal of the fabrication tool from material can result in an inline transducer meter body having an inner surface formed by the surface of the fabrication tool, an inlet and an outlet, a circular shelf integrated in an inline transducer meter body adapted to receive a transducer assembly that interfaces in a complimentary manner with a circular ledge of a circular head section of the transducer assembly a square or rectangular portal formed between the circular shelf and an inner surface of the inline transducer meter body adapted to interface in a complimentary manner with an alignment section of the transducer assembly having a reduced surface area to reduce upshot force on the alignment section by fluid flowing through the inline transducer meter body and past the square or rectangular portal, and a notch formed in the inner surface of the flow tube opposite the square or rectangular portal and adapted to interface with a positioner formed on and extending from a transducer holder as part of the transducer assembly, the transducer holder positioned near a center of the inline transducer meter body between the square or rectangular portal and the notch, the positioner further configured to operate with the square or rectangular portal to secure the transducer holder in alignment with the fluid as it flows through the inline transducer meter body.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate one or more embodiments and are not intended to limit the scope thereof.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other issues, subject matter may be embodied as methods, devices, components, or systems. Accordingly, embodiments may, for example, take the form of hardware, software, firmware, or a combination thereof. The following detailed description is, therefore, not intended to be interpreted in a limiting sense.

Throughout the specification and claims, terms may have nuanced meanings suggested or implied in context beyond an explicitly stated meaning. Likewise, phrases such as "in one embodiment" or "in an example embodiment" and variations thereof as utilized herein may not necessarily refer to the same embodiment and the phrase "in another embodiment" or "in another example embodiment" and variations thereof as utilized herein may or may not necessarily refer to a different embodiment. It is intended, for example, that claimed subject matter include combinations of example embodiments in whole or in part.

In general, terminology may be understood, at least in part, from usage in context. For example, terms such as "and," "or," or "and/or" as used herein may include a variety of meanings that may depend, at least in part, upon the context in which such terms are used. Generally, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms such as "a," "an," or "the", again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

As discussed earlier flow meters used in industrial process can measure fluid moving through conduit. More effective measurements can be obtained when transducers are placed inline with the flowing fluid. The disclosed embodiments can offer a solution for providing a housing that can accommodate placing transducers inline with fluid flow. Although reference may be made to meter assemblies, embodiments are not limited to meters used to monitor fluid flow and can more broadly apply to "housings" that can accommodate various transducers for measurement purposes. The embodiments can be used in bi-directional operation conditions.

Figure 1:
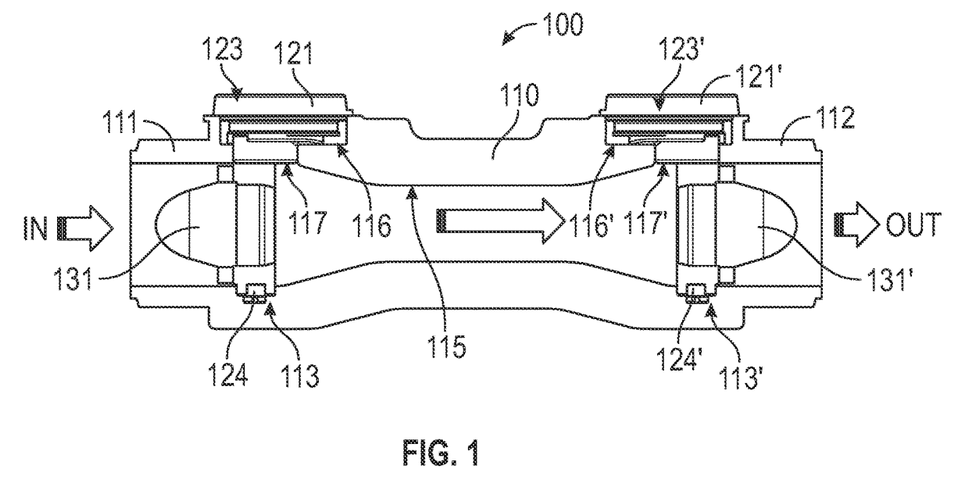
FIG. 1 illustrates a diagram of an inline transducer meter assembly, in accordance with the embodiments.

Referring to FIG. 1, an inline transducer meter assembly 100 is illustrated in accordance with an embodiment. The inline transducer meter assembly 100 can also be referred to generally in industry and within this description as a "flow tube assembly". The inline transducer meter assembly 100 includes an inline transducer meter body 110 with an inlet 111 where fluid can flow into the inline transducer meter assembly 100 and an outlet 112 where fluid can flow out of the inline transducer meter assembly 100. The inline transducer meter assembly 100 can be adapted to hold at least one transducer 121 between the inlet 111 and the outlet 112 and in-line with fluid flowing through an inline transducer meter body 110.

The embodiment shown in FIG. 1 illustrates two transducer assemblies 121 and 121' mounted into the inline transducer meter body 110 between the inlet 111 and the outlet 112. Although it should be appreciated that a single transducer can be mounted into the inline transducer meter body 110 for some applications, the two transducer assemblies 121 and 121' shown in FIG. 1 can be, for example, two ultrasonic transducers facing each other within the inline transducer meter body 110. The configuration illustrated in FIG. 1 is not meant to limit the scope of the embodiments.

Figure 2:
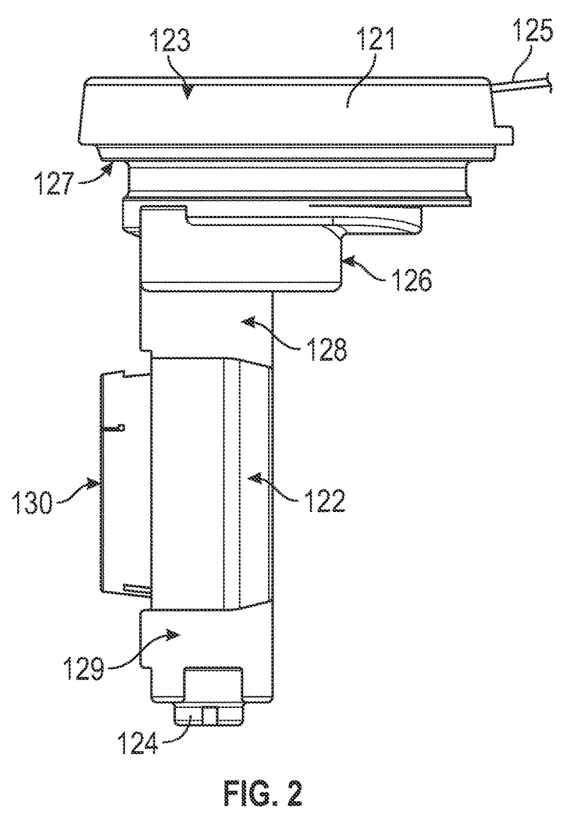
FIG. 2 illustrates a diagram of transducer assembly, in accordance with the embodiments.

Now referring to both FIG. 1 and FIG. 2, the first transducer assembly 121 located near the inlet 111 can include a circular head section 123 having a circular ledge 127 adapted to interface in a complimentary manner with circular shelf 116 integrated in a flow tube. A square or rectangular alignment section 126 can be provided on the first transducer assembly 121 that extends from the circular head section 123 past the circular shelf 116 and can be formed and adapted to interface in a complimentary manner with a square or rectangular portal 117 formed between the circular shelf 116 and an inner surface 115 forming an interior of the inline transducer meter body 110. The square or rectangular alignment section 126 can have a reduced surface area to reduce upshot force on the square or rectangular alignment section 126 by fluid flowing through the inline transducer meter body 110 and past the square or rectangular portal 117. A transducer holding area 122 can be provided that extends from the square or rectangular alignment section 126 into a center inner area of the inline transducer meter body 110 wherein fluid flows through the inline transducer meter body 110.

Where two transducers are utilized, the transducer holder 122 can be adapted to retain a first transducer therein while in alignment within the inline transducer meter body 110 with a second transducer located in a transducer holder of a second transducer assembly 121' held within the inline transducer meter body 110 downline from the first transducer assembly 121 near the outlet 112.

The first transducer holder 122 can be formed in a fluid flow enhancing profile and includes a configuration 130, to retain a flow conditioner 131 in front of the fluid flowing through the inline transducer meter body 110. A fluid flow enhancing profile can also be accomplished by utilizing a first narrow support 128 formed between the first transducer holder 122 and the square or rectangular alignment section 126, and a second narrow support 129 formed between the first transducer holder 122 and a positioner formed on and extending from the narrow support 129 opposite the first transducer holder, wherein the positioner 124 can interface with a notch 113 that can be formed in the inner surface 115 of the inline transducer meter body 110 opposite the square or rectangular portal 117. The notch 113 can function as a location feature for the positioner 124. The positioner 124 can be further configured with its placement in the notch 113 to secure the first transducer assembly 121 and any transducer held within the first transducer holder 122 in alignment with fluid flowing through the inline transducer meter body 110.

Referring to FIG. 1 again, where two complimentary transducer assemblies 121 and 121' are mounted in an inline transducer meter body 110, as can be the case where ultrasonic transducer are utilized, a second transducer assembly 121' located downline from the first transducer assembly 121 near the outlet 112 can also include a circular head section 123' having a circular ledge 127, a transducer holding area 122 that extends from a square or rectangular alignment section 126, a fluid flow enhancing profile with a transducer holding area 122 that can be configured to retain a flow conditioner 131', but behind fluid flowing through the inline transducer meter body 110. The fluid flow enhancing profile for the second transducer assembly 121' can also be accomplished by utilizing a first narrow support 128 formed between the transducer holder 122 and the square or rectangular alignment section 126 formed and adapted to interface with a square or rectangular portal 117' formed between circular shelf 116' and an inner surface 115, and a second narrow support 129 formed between the first transducer holder 122 and a positioner 124' formed on and extending from the narrow support 129 opposite the transducer holder 122, wherein positioner 124' can interface with a second notch 113' formed in the inner surface 115 of the inline transducer meter body 110 opposite a second square or rectangular portal 117'. As with positioner 124, positioner 124' can be configured given its secured interface with the notch 113' to further secure the second transducer assembly 121' and any transducer held within the first transducer holder 122 in alignment with fluid flowing through the inline transducer housing assembly body 110 near the outlet 112.

The circular ledge 127 of the second transducer assembly 121' will be adapted to interface in a complimentary manner with circular shelf 116' integrated in the inline transducer meter body 110. A square or rectangular alignment section 126 can be provided on the second transducer assembly 121' that extends from the circular head section 123 past circular shelf 116' and can be formed and adapted to interface a complimentary manner with square or rectangular portal 117' formed between the circular shelf 116' and the inner surface 115 forming an interior of the inline transducer meter body 110.

Figure 3:
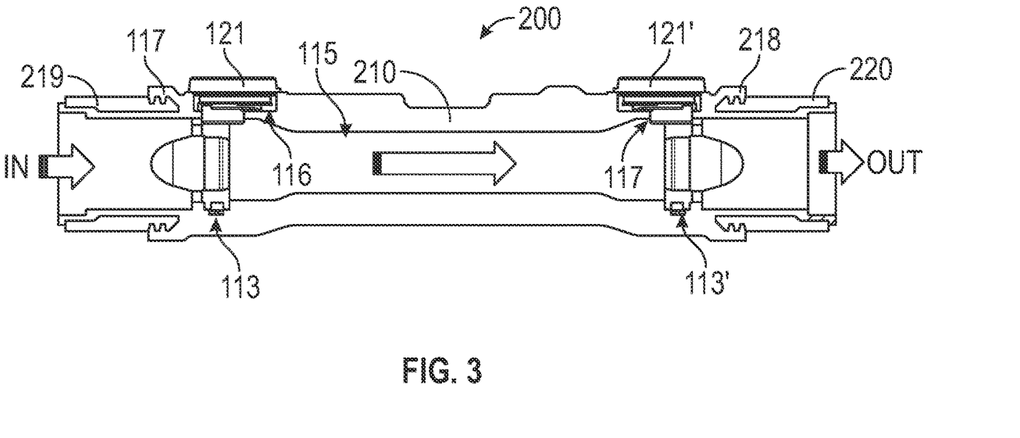
FIG. 3 illustrates a diagram of another inline transducer meter assembly, in accordance with the embodiments.

Referring to FIG. 3, an inline transducer housing assembly 200 is illustrated in accordance with another embodiment. The inline transducer housing assembly 200 shown here can also be referred to generally in industry as a "flow tube". The inline transducer meter assembly 200 can also include an inline transducer meter body 210 with an inlet 211 where fluid can flow into the inline transducer meter assembly 200 and an outlet 212 where fluid can flow out of the inline transducer meter assembly 200. The inline transducer meter assembly 200 can also be adapted to hold at least one transducer assembly 121 or 121' between the inlet 211 and the outlet 212 and in-line with fluid flowing through an inline transducer meter body 210. The inline transducer meter assembly 200 can also have at least one circular shelf 116, at least one square or rectangular portal 117, and at least one notch 113 formed in the inline transducer meter body 210 of the inline transducer meter assembly 200. What is further shown in FIG. 3 is that locking interfaces 217 and 218 can be formed with the inline transducer meter body 210 to connect the inline transducer meter assembly 200 with conduit 219/220 so that fluid if flowing through and into the inline transducer housing assembly 200 can be effectively spliced into the conduit for metering purposes.

Figure 4:
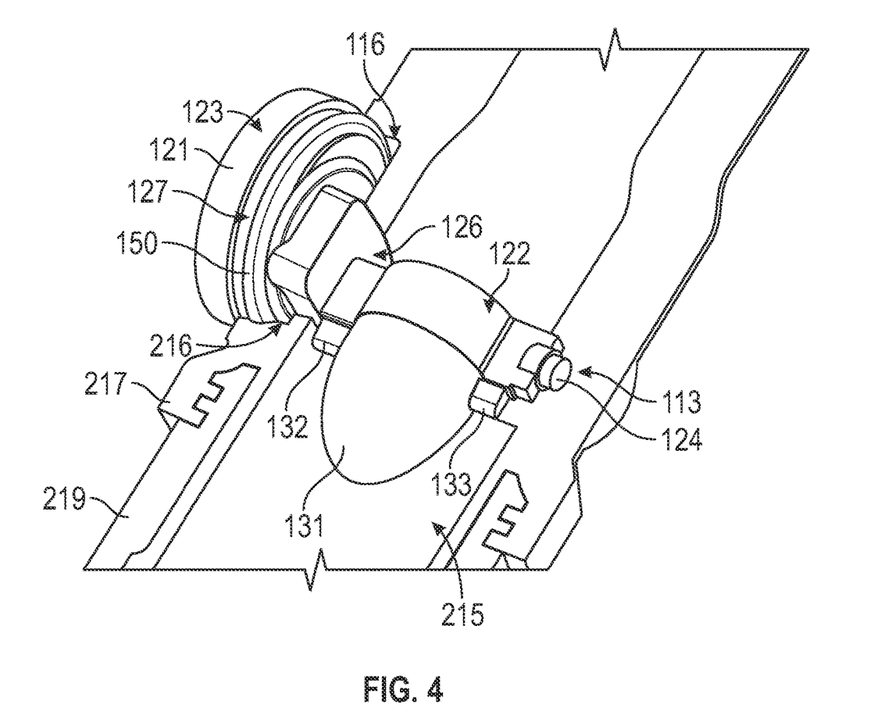
FIG. 4 illustrates a close up perspective of an inline transducer meter assembly with a transducer assembly installed therein, in accordance with the embodiments.

Referring to FIG. 4, illustrated is a close up perspective of a transducer 121 mounted in an inline transducer meter body 210. A rubber seal 150 in the form of an O-ring is shown mounted onto the circular ledge 127 of the circular head section 123. The rubber seal 150 can be used to create a tight seal between the circular ledge 127 where it can interface in a complimentary manner with circular shelf 216 formed on the inline transducer meter body 210. Also shown in a conical shape of the conditioner 131. The conditioner 131 is also shown with fluid-flow enhancing arms 132/133 that can cover the first and second narrow supports 128/129 of the transducer holder 122.

Figure 5:
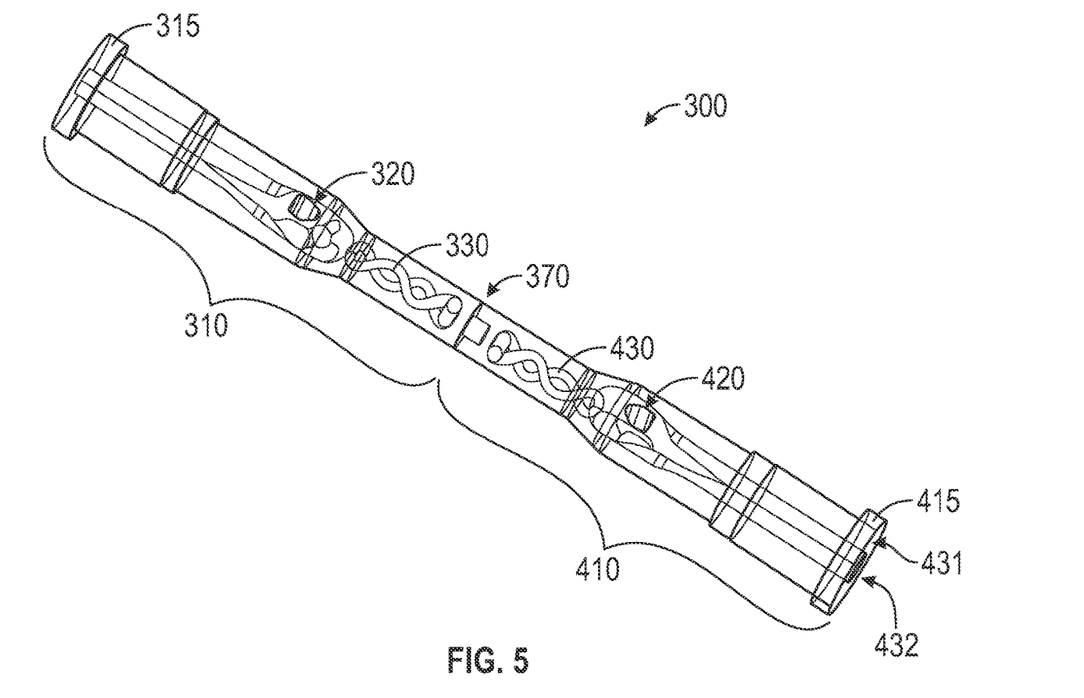
FIG. 5 illustrates a diagram of a fabrication tool that can be utilized to fabricate an inline transducer housing assembly body for an inline transducer housing assembly, in accordance with the embodiments.

Referring to FIG. 5, illustrated is a fabrication tool 300 that can be utilized to fabricate the inline transducer meter body 110 for the inline transducer meter assembly 100, hereinbefore described, that is formed using 3D printing techniques. The fabrication tool 300 can be utilized to 3D fabricate the inline transducer meter body 110. Additive manufacturing eliminates various design limitations imposed by existing production methods. Highly complex components that could not be produced in the past are now possible using additive manufacturing. The inline transducer meter body 110 can be formed on the surface of the fabrication tool 300, which can be made of metal.

As shown in section 410 of the fabrication tool 300, incorporated therein can be cooling channels 431/432 to introduce a fluid coolant into the tool to keep its surface cool as material is formed on the outer surface of the tool using additive manufacturing techniques, which are known to produce heat. Fluid can be introduced into channel 431 where it moves through coiled tubing 430/330, and then the fluid can be returned (i.e., exit from) channel 432. Fluid can flow continuously through the coiled tubing 430/330 during fabrication of the inline transducer assembly body 110. Cooled cores represented by fabrication tool 300 allow for the use of complex cooling channels, which help achieve dimensional stability and straightness for parts, such as the inline transducer meter body 110, during manufacturing.

To achieve tapered shape of the inner surface 115 of the inline transducer housing assembly body 110, the fabrication tool 300 can be provided in two sections 310/410, which can be connected together 370 during processing of the inline transducer meter body 110. When fabrication of the inline transducer meter body 110 is completed, section 310 can be separated from section 410. What remains after section 310 and 410 are separated is the central core of a fabricated inline transducer meter body 110 as illustrated in FIGS. 1 and 3.

Figure 6:
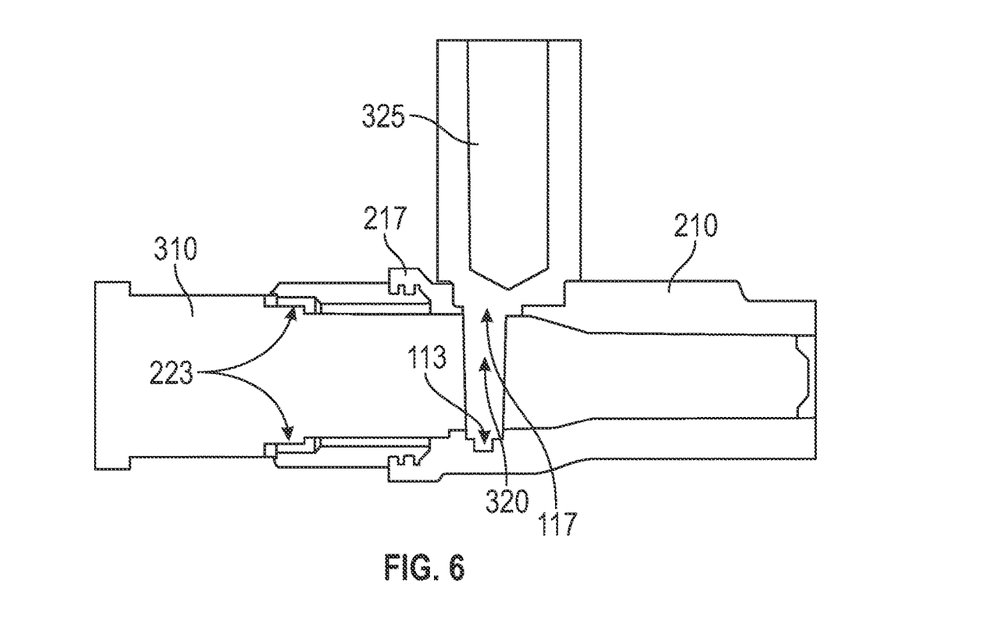
FIG. 6 illustrates a diagram of an inline transducer housing assembly body formed around a fabrication tool and including a channel formed by a core when removed from the fabrication tool after fabrication, in accordance with the embodiments.
Figure 7:
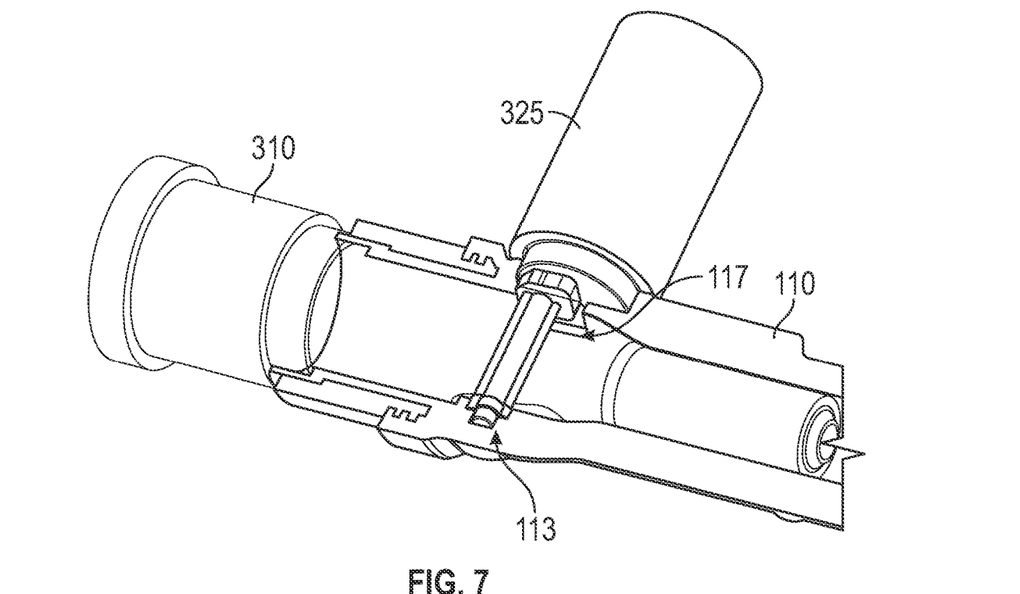
FIG. 7 illustrates another diagram and perspective of an inline transducer housing assembly body formed around a fabrication tool and including a channel formed by a core while the core is installed in the fabrication tool during fabrication, in accordance with the embodiments.

Now referring to FIGS. 5, 6 and 7, in order to accomplish formation of the square or rectangular portal 117 and the notch 113 in the inline transducer meter body 110 during the moulding process, the fabrication tool can include a channel 320/420 wherein a core 325 can be slid into the channel 320/420. The core 325 an prevent material from being placed/deposited where the core 325 is situated within the fabrication tool 300 during moulding/processing. Once the core 325 is removed (after moulding of the flow tube is completed), the notch 113 will remain formed in the inner surface and square or rectangular portal 117 will remain formed through the inline transducer meter body 110.

Figure 8:
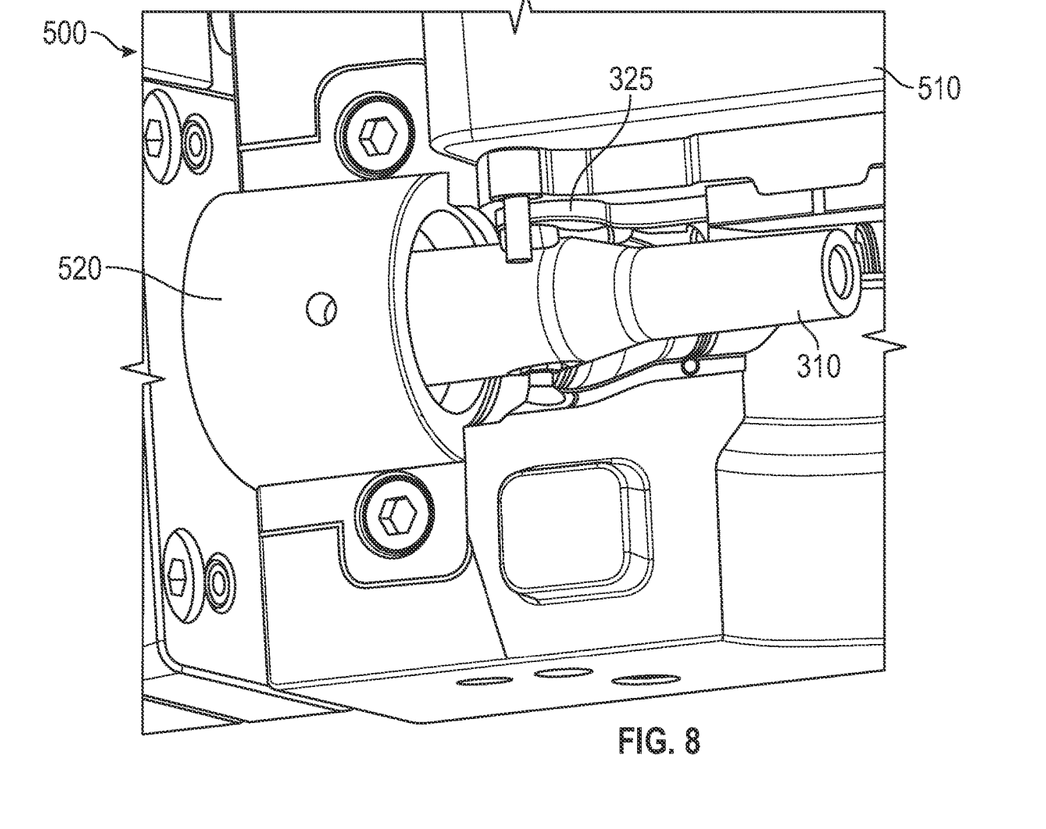
FIG. 8 illustrates an exemplary block diagram of components of an injection mould tool including a core and moving sections securely mounted to the system for moulding an inline transducer housing assembly body, in accordance with the embodiments.

Referring to FIG. 8, illustrated is an exemplary block diagram of components of an injection mould tool 500 including a core 325 and moving section 310 securely mounted for part moulding. Section 310 can be held within block 520 by brass threaded ends 219/220, while core 325 is inserted into section 310. Material can then flow over Section 310 to form the inline transducer meter body.

Figure 9:
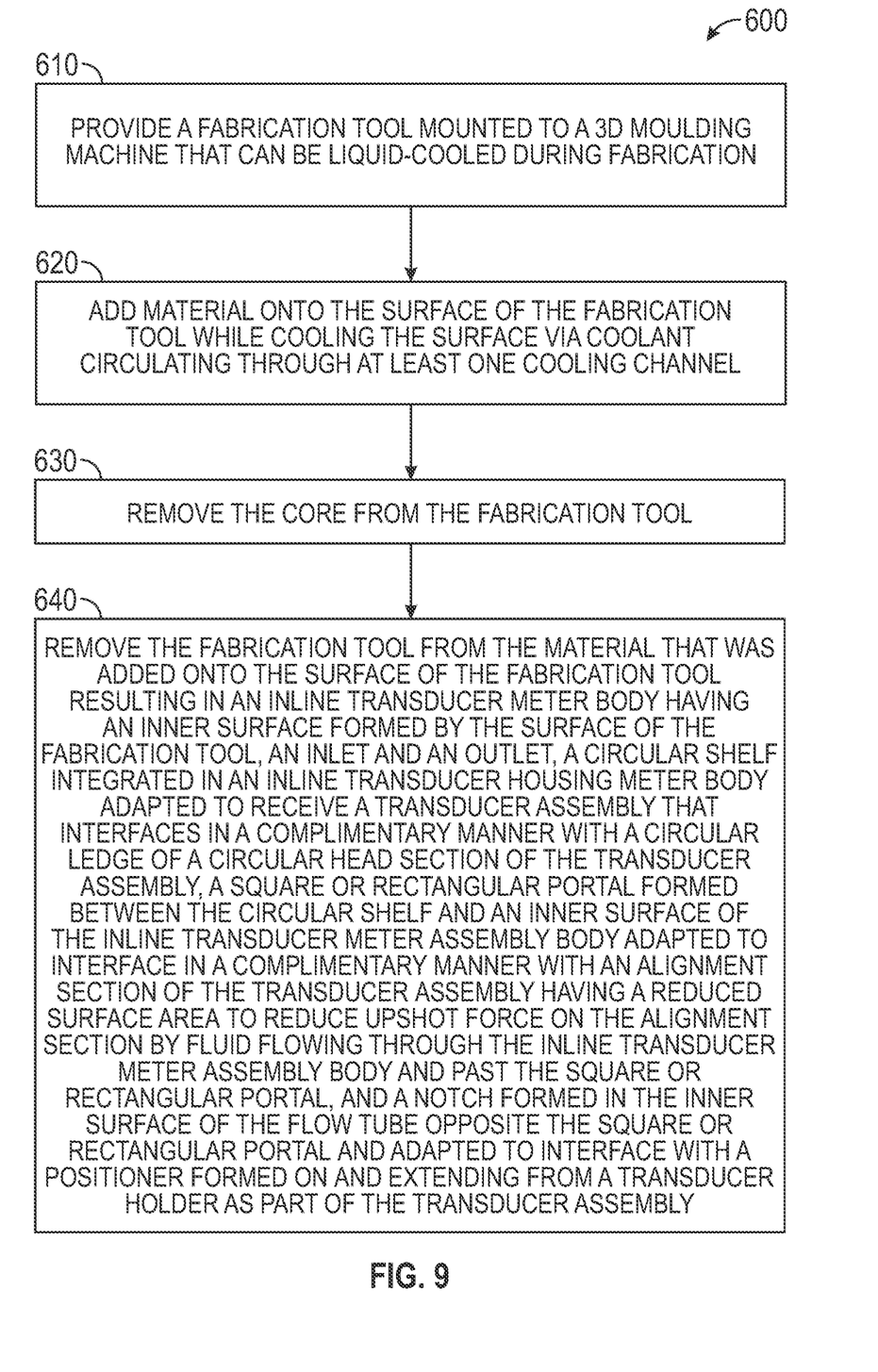
FIG. 9 illustrated a block diagram of a method for fabricating an inline transducer housing assembly body, in accordance with the embodiments.

Referring to FIG. 9, illustrated is a block diagram 600 of method steps for fabricating an inline transducer assembly body via 3D printing, in accordance with the embodiments. Referring to Block 610, a fabrication tool can be provided that can be mounted to a 3D moulding machine and liquid-cooled during fabrication. The fabrication tool can have moving sections created by a 3D printer and can include at least one cooling channel therein for accepting fluid coolant to keep the surface cool during fabrication of the inline transducer meter body. The fabrication tool can have at least one channel formed through the surface that is configured to receive a square or rectangular core therein to prevent material from being placed in the channel during fabrication. Referring to Block 620, material can be added onto the surface of the fabrication tool while cooling the surface via coolant circulating through the at least one cooling channel. Referring to Block 630, the core can be removed from the fabrication tool. Then as shown in Block 640 the fabrication tool can be removed from the material that was added onto the surface of the fabrication tool resulting in an inline transducer meter body having an inner surface formed by the surface of the fabrication tool, an inlet and an outlet, a circular shelf integrated in an inline transducer meter body adapted to receive a transducer assembly that interfaces in a complimentary manner with a circular ledge of a circular head section of the transducer assembly, a square or rectangular portal formed between the circular shelf and an inner surface of the inline transducer meter body adapted to interface in a complimentary manner with an alignment section of the transducer assembly having a reduced surface area to reduce upshot force on the alignment section by fluid flowing through the inline transducer meter body and past the square or rectangular portal, and a notch formed in the inner surface of the flow tube opposite the square or rectangular portal and adapted to interface with a positioner formed on and extending from a transducer holder as part of the transducer assembly.

The transducer holder can be positioned near a center of the inline transducer meter body between the square or rectangular portal and the notch. The positioner can be further configured to operate with the square or rectangular portal to secure the transducer holder in alignment with the fluid as it flows through the inline transducer meter body. Coolant fluid can be introduced into a first channel where it moves through coiled tubing within the fabrication tool and then the coolant fluid is returned from the fabrication tool from a second channel. Coolant fluid can flow continuously through the coiled tubing during fabrication of the inline transducer assembly body. The fabrication tool can also include a tapered surface. Two fabrication tools can be connected together to create a tapered inlet and a tapered outlet within the inline transducer assembly body. The two fabrication tools can then be separated after fabrication leaving an inline transducer assembly body that includes a tapered inlet and tapered outlet.

It will be appreciated that variations of the above-disclosed embodiments and examples and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the following claims.

The invention claimed is:

1. An inline transducer meter assembly having an inlet and an outlet for fluid flowing through the inline transducer meter assembly from the inlet to the outlet, the inline transducer meter assembly comprising:

a circular shelf integrated in an inline transducer meter body adapted to receive a transducer assembly that interfaces in a complimentary manner with a circular ledge of a circular head section of the transducer assembly, wherein an O-ring is mounted onto the circular ledge of the circular head section to create a seal between the circular ledge to interface in a complimentary manner with the circular shelf formed on the inline transducer meter body;

a square or rectangular portal formed between the circular shelf and an inner surface of the inline transducer meter body adapted to interface in a complimentary manner with an alignment section of the transducer assembly having a reduced surface area to reduce upshot force on the alignment section by fluid flowing through the inline transducer housing assembly body and past the square or rectangular portal;

a notch formed in the inner surface of the flow tube opposite the square or rectangular portal and adapted to interface with a positioner formed on and extending from a transducer holder as part of the transducer assembly, said transducer holder positioned near a center of the inline transducer meter body between the square or rectangular portal and the notch, said positioner further configured to operate with the square or rectangular portal to secure the transducer holder in alignment with the fluid as it flows through the inline transducer meter body; and at least one locking interface configured with the inline transducer meter body to connect the inline transducer meter assembly with at least one conduit.

2. The inline transducer meter assembly of claim 1, further comprising a second transducer holder, wherein each of the transducer holder and the second transducer holder includes at least one piezoelectric element therein and in communication with each other.

3. The inline transducer meter assembly of claim 2, wherein the at least one piezoelectric element is connected by a wire that is accessible from the circular head section.

4. The inline transducer meter assembly of claim 1, further comprising at least one flow conditioner coupled to a surface of the transducer holder to enhance flow of fluid passing through the inline transducer assembly body.

5. The inline transducer meter assembly of claim 1, further comprising:

a second circular shelf integrated in the inline transducer meter body between the circular shelf and the outlet, said second circular shelf adapted to receive a second transducer assembly and interface in a complimentary manner with a circular ledge of a circular head section of the second transducer assembly;

a second square or rectangular portal formed between the second circular shelf and the inner surface of the inline transducer meter body, said second square or rectangular portal adapted to interface in a complimentary manner with an alignment section of the second transducer assembly having a reduced surface area to reduce upshot force on the alignment section by fluid flowing through the inline transducer meter body and past the second square or rectangular portal; and a second notch formed in the inner surface of the inline transducer meter body opposite the second square or rectangular portal and adapted to interface with a second positioner formed on and extending from a second transducer holder as part of the second transducer assembly, said second transducer holder positioned near a center of the inline transducer meter body between the second square or rectangular portal and the second notch, said second positioner further configured to operate with the second square or rectangular portal to secure said second transducer holder in alignment with fluid flowing through the inline transducer meter body.

6. The inline transducer meter assembly of claim 5, wherein the transducer assembly is positioned with its transducer holder in the inline transducer meter body near the inlet and the second transducer assembly is positioned near the outlet with its transducer holder in the inline transducer meter body and in alignment with the transducer assembly's transducer holder.

7. The inline transducer meter assembly of claim 6, further comprising at least one flow conditioner coupled to a surface of at least one of the first and second transducer holders to enhance flow of fluid passing through the inline transducer assembly body.

8. The inline transducer meter assembly of claim 5, wherein the transducer holders of the transducer assembly and the second transducer assembly include piezoelectric element therein and in communication with each other.

9. The inline transducer meter assembly of claim 8, wherein the piezoelectric element is connected by a wire that is accessible from the circular head section.

10. The inline transducer meter assembly of claim 5, further comprising at least one flow conditioner coupled to a surface of at least one of the first and second transducer holders to enhance flow of fluid passing through the inline transducer meter body.

11. An inline transducer housing assembly, comprising:

a circular head section having a circular ledge adapted to interface with a circular shelf integrated in a flow tube;

a square or rectangular alignment section extending from the circular head section within the circular shelf and adapted to interface with a square or rectangular portal formed between the shelf and an inner surface of the flow tube, said square or rectangular alignment section having a reduced surface area to reduce upshot force on the square or rectangular alignment section by fluid flowing through the flow tube;

a transducer holder extending from the square or rectangular alignment section into an inner area of the flow tube wherein fluid flows through the flow tube, said transducer holder adapted to retain a first transducer in alignment with a second transducer retained in a second transducer holder located in the flow tube downline from said transducer holder, said transducer holder formed in a fluid flow enhancing profile and configured to retain a flow conditioner in front of the fluid flowing through the flow tube;

a positioner formed on and extending from the transducer holder opposite the circular head section, said positioner configured to interface with a notch formed in the inner surface of the flow tube opposite the square or rectangular portal, said positioner further configured to secure the transducer holder and the first transducer held in alignment with fluid flowing through the flow tube;

a first narrow support formed between the transducer holder and the square or rectangular alignment section and adapted to interface with the square or rectangular portal formed between the circular shelf and an inner surface; and a second narrow support formed between the first holder and the positioner formed on and extending from the second narrow support opposite the transducer holder.

12. The inline transducer meter assembly of claim 11, further comprising:

a second circular shelf integrated in the inline transducer meter body between the circular shelf and the outlet, said second circular shelf adapted to receive a transducer assembly and interface in a complimentary manner with a circular ledge of a second circular head section of the transducer assembly;

a second square or rectangular portal formed between the second circular shelf and the inner surface of the inline transducer meter body, said second square or rectangular portal adapted to interface in a complimentary manner with an alignment section of the transducer assembly having a reduced surface area to reduce upshot force on the alignment section by fluid flowing through the inline transducer meter body and past the second square or rectangular portal; and a second notch formed in the inner surface of the inline transducer meter body opposite the second square or rectangular portal and adapted to interface with a positioner formed on and extending from a second transducer holder as part of a second transducer assembly, said second transducer holder positioned near a center of the inline transducer meter body between the second square or rectangular portal and the second notch, said positioner further configured to operate with the second square or rectangular portal to secure the second transducer holder in alignment with fluid flowing through the inline transducer meter body.

13. The inline transducer meter assembly of claim 12, wherein the transducer assembly is positioned with its transducer holder in the inline transducer assembly body near the inlet and the second transducer assembly is positioned near the outlet with its transducer holder in the inline transducer meter body and in alignment with the transducer assembly's transducer holder.

14. The inline transducer meter assembly of claim 12, wherein the transducer holders of the transducer assembly and the second transducer assembly include piezoelectric element therein and in communication with each other.

15. The inline transducer meter assembly of claim 12, further comprising at least one flow conditioner coupled to a surface of at least one of the transducer holders to enhance flow of fluid passing through the inline transducer assembly body.

16. The inline transducer meter assembly of claim 11, further comprising a flow conditioner coupled to a surface of the transducer holder to enhance flow of fluid passing through the inline transducer assembly body.

* * * * *